(12) United States Patent
Mival et al.

(10) Patent No.: US 8,376,375 B2
(45) Date of Patent: Feb. 19, 2013

(54) PUSHCHAIR SEAT

(75) Inventors: Nicholas James Mival, Ibstone (GB); Andrew Gordon Wallace, Nr. Newent (GB); Martin Paul Bagwell, Leamington Spa (GB); Mark Anthony John Fernandes, Leamington Spa (GB); Benjamin James Peter Hubert, London (GB); Simon Lewis Bilton, Leamington Spa (GB)

(73) Assignee: Mama and Papas (Holdings) Ltd., Yorkshire (GB)

( * ) Notice: Subject to any disclaimer, the term of this patent is extended or adjusted under 35 U.S.C. 154(b) by 143 days.

(21) Appl. No.: 12/808,217

(22) PCT Filed: Dec. 16, 2008

(86) PCT No.: PCT/GB2008/051192
§ 371 (c)(1),
(2), (4) Date: Aug. 24, 2010

(87) PCT Pub. No.: WO2009/077787
PCT Pub. Date: Jun. 25, 2009

(65) Prior Publication Data
US 2010/0308552 A1 Dec. 9, 2010

(30) Foreign Application Priority Data
Dec. 17, 2007 (GB) .................................. 0724513.7

(51) Int. Cl.
*A47D 1/00* (2006.01)

(52) U.S. Cl. ...... 280/47.38; 297/16.1; 297/19; 280/643; 280/648; 280/650; 280/658; 280/47.25

(58) Field of Classification Search .......... 280/642–644, 280/647–650, 657–658, 47.25, 47.38–47.41
See application file for complete search history.

(56) References Cited

U.S. PATENT DOCUMENTS
5,257,799 A * 11/1993 Cone et al. ................... 280/642

FOREIGN PATENT DOCUMENTS
| DE | 9414431 U1 | 11/1994 |
| GB | 2418179 A | 3/2006 |
| JP | 01297372 A | 11/1989 |
| WO | WO2005/100127 A1 | 10/2005 |
| WO | WO2007/053019 A2 | 5/2007 |

* cited by examiner

*Primary Examiner* — Jeffrey J Restifo
*Assistant Examiner* — Erez Gurari
(74) *Attorney, Agent, or Firm* — Gordon & Jacobson, PC

(57) ABSTRACT

A pushchair seat (10) comprising a seat back (18) mounted for pivotable movement relative to a seat base (20). A bumper bar (14) is pivotably coupled to and carried by the seat (10) and is moveable between a stowed position generally adjacent to the seat base (20) and a deployed position spaced from the seat back (18) and the seat base (20). Drive mechanisms (16) are provided at each end of the bumper bar (14) and comprise a selectively engageable coupling mechanism in the form of a clutch mechanism (30, 32) and a control mechanism (34, 56, 58). The coupling mechanism couples movement of the seat back (18) between its stowed position and its operating position into a corresponding movement of the bumper bar (14) between its stowed position and its deployed position.

15 Claims, 10 Drawing Sheets

PUSHCHAIR SEAT

BACKGROUND OF THE INVENTION

1. Field of the Invention

The invention relates to a seat for a pushchair.

The product to which the invention relates is referred to as a pushchair in the UK, but is also known as a stroller or a buggy in other countries. The term pushchair is therefore use here to mean a pushchair, stroller or buggy.

2. State of the Art

Parents and carers often need to be able to disassemble and collapse a child's pushchair in order to put the pushchair into a vehicle or carry the pushchair onto public transport. There is a problem with many existing pushchair designs in that it is difficult for a sole person to disassemble and collapse a pushchair by a single handed operation, this being necessary due to the need to hold the child whilst collapsing the frame of the pushchair. In addition, many existing pushchairs have large and bulky seats, which do not collapse down to an adequately small size, making it difficult to manoeuvre the pushchair into a vehicle or onto public transport.

SUMMARY OF THE INVENTION

According to an aspect of the invention there is provided a seat for a pushchair, the seat comprising:

a seat body comprising a seat back and a seat base, the seat back being mounted for pivotable movement relative to the seat base and being movable between a stowed position generally adjacent to the seat base and an operating position spaced from and extending generally upwardly from the seat base;

a bumper bar pivotably coupled to and carried by the seat body, the bumper bar being movable between a stowed position generally adjacent to the seat base and a deployed position spaced from the seat back and the seat base; and a drive mechanism comprising a selectively engageable coupling mechanism provided between the seat back and the bumper bar and operable to couple movement of the seat back between its stowed position and its operating position into corresponding movement of the bumper bar between its stowed position and its deployed position, and a control mechanism operable to disengage the selectively engageable coupling mechanism once the bumper bar has reached its deployed position, such that the relative positions of the bumper bar and the seat base become fixed.

The drive mechanism couples movement of the seat back into corresponding movement of the bumper bar, so that the seat can be simply and easily unfolded by lifting the seat back into its operating position, which causes the bumper bar to move into and be fixed in its deployed position. The seat can therefore be unfolded by a single-handed operation, following which the seat is ready to receive an occupant. A parent or carer can therefore unfold the seat whilst holding a child, following which the child can be directly put into the seat. Any further movement of the seat back away from the seat base will not produce further movement of the bumper bar.

The control mechanism is preferably further operable to engage the selectively engageable coupling mechanism as the seat back is moved from the operating position towards its stowed position. The bumper bar is thereby moved from its deployed position to its stowed position as the seat back is moved from its operating position to its stowed position. The seat can thus be folded by a single-handed operation of moving the seat back.

The selectively engageable coupling mechanism preferably comprises a clutch mechanism comprising a driving member coupled to the seat back and a driven member coupled to the bumper bar, the driving member being arranged such that as the seat back is moved the driving member engages with the driven member and causes the driven member to rotate, thereby causing corresponding movement of the bumper bar.

Preferably, the driven member is carried by the bumper bar and is rotationally fixed relative to the bumper bar and mounted for axial movement relative to the bumper bar. Preferably, the bumper bar is provided with a complimentarily shaped housing socket within which the driven member is located. The driven member is preferably provided with one or more external locating elements located within corresponding locating sockets formed within the housing socket. The locating elements are preferably axially extending splines.

Preferably, the driving member is arranged such that as the seat back is unfolded from its stowed position to an intermediate position the driving member is brought into engagement with the driven member, and as the seat back is subsequently moved from the intermediate position towards the operating position the driving member causes the driven member to rotate, thereby moving the bumper bar from its stowed position towards its deployed position.

Preferably, the driving member is provided with a cam member and the driven member is provided with a cam follower. The cam member and the cam follower are preferably arranged such that a first rotational movement of the driving member causes the cam member to engage with the first cam follower and subsequent rotational movement of the driving member causes the driven member to correspondingly rotate. Alternatively, the cam member and the cam follower may be arranged such that movement of the cam member starts from a position of engagement with the cam follower and rotational movement of the drive member causes the driven member to correspondingly rotate.

The driving member is preferably arranged such that as the seat back is moved from its operating position to an engagement position in the region of the deployed position of the bumper bar the driving member is brought into engagement with the driven member, and as the seat back is subsequently moved towards its stowed position the driving member causes counter-rotation of the driven member, thereby moving the bumper bar towards its stowed position.

The control mechanism preferably comprises an actuator operable to move the driving member axially relative to the driven member, such that the cam member is moved out of alignment with the cam follower. The driven member preferably comprises a recess adapted to at least partially receive the driving member when it is out of alignment and in which the driven member is free to rotate. Further movement of the seat back, and thus corresponding further rotation of the driving member, is thereby enabled but occurs without causing further rotation of the driven member and the bumper bar.

Preferably, the control mechanism further comprises a locking socket provided on the seat base and a key member provided on the driven member, the locking socket being adapted to at least partially receive the driven member and the key member, and the actuator is adapted to bias the driven member towards the locking socket such that when the bumper bar reaches its deployed position, the key member becomes aligned with the locking socket and the actuator causes axial movement of the driven member and the key member into the locking socket. The driven member, and thus the bumper bar, is thereby automatically locked in position relative to the seat base when the bumper bar reaches its deployed position. In addition, disengagement of the clutch mechanism and locking of the bumper bar position is simply achieved by a single operation.

Preferably, the actuator comprises a resilient bias member, such as a spring.

The key member preferably comprises an axially extending key spline externally provided on the driven member, the key spline being of a different size and/or shape to the or each locating spline.

The cam member and the cam follower may alternatively or additionally be arranged such that a first counter-rotational movement of the driving member causes the cam member to engage with the cam follower and subsequent counter-rotational movement of the driving member releases the driven member from the locking socket and causes the driven member to correspondingly rotate, causing the bumper bar to move towards its stowed position.

Counter-rotation is to be understood to mean rotation caused by the seat back moving towards the seat base, and is therefore of the opposite sense to the rotation occurring during movement of the seat back away from the seat base.

Preferably, the cam member has a ramped leading edge, such that the subsequent counter-rotation of the driving member causes axial movement of the driven member out of the locking socket. The driven member, and thus the bumper bar, is thereby automatically unlocked and the clutch mechanism is automatically engaged, via a single operation, as the seat is folded The seat may further comprise a mechanical ratchet mechanism coupled between the seat back and the seat base and operable to control movement of the seat back between its operating position and a reclined position. The seat preferably further comprises a release mechanism operable to release the ratchet mechanism to allow the seat back to move towards the seat base.

The seat may further comprise a foot rest pivotably coupled to the seat base. The foot rest is preferably coupled to the seat base via mechanical ratchet means operable to allow the position of the foot rest to be step varied. The mechanical ratchet means is preferably further operable to release the foot rest to allow it to drop under its own weight to a lower position.

An embodiment of the invention will now be described in more detail, by way of example only, with reference to the accompanying drawings.

BRIEF DESCRIPTION OF THE PREFERRED EMBODIMENTS

Figure 1:
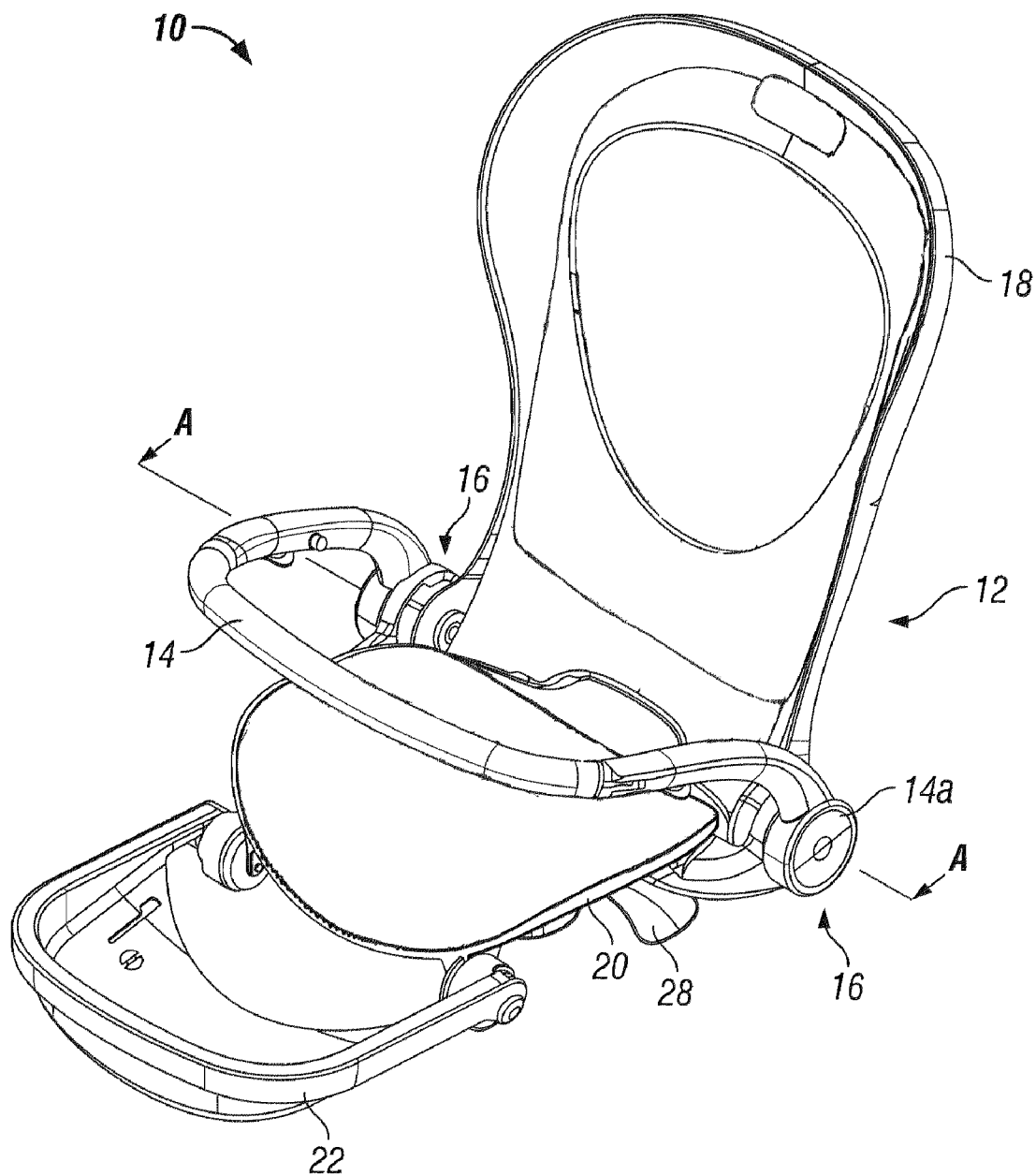
FIG. 1 is a diagrammatic representation of a seat according to a first embodiment of the invention.
Figure 2:
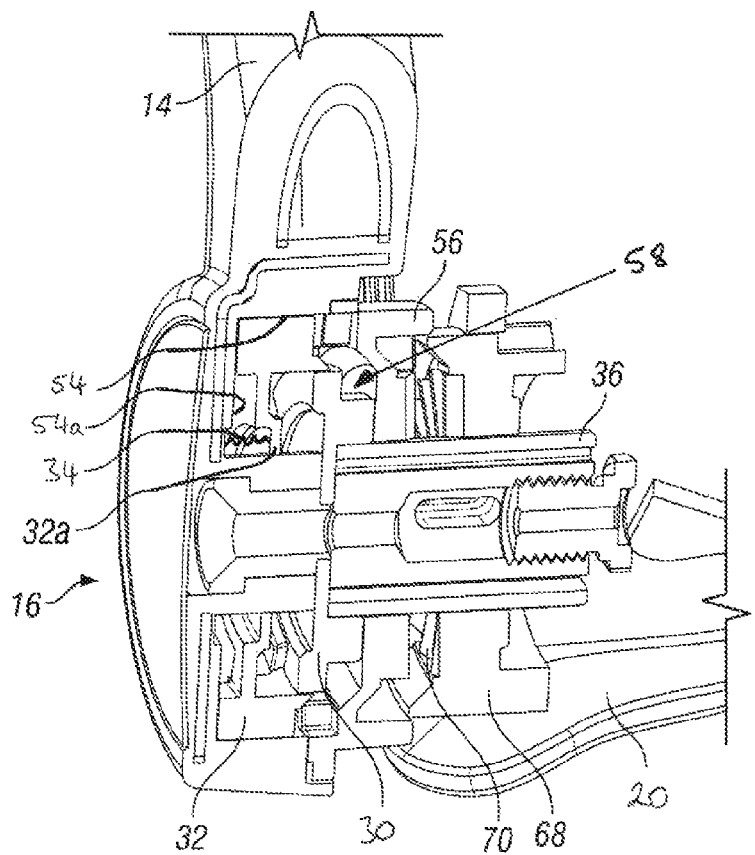
FIG. 2 is a diagrammatic part-cut away representation along line A-A of a drive mechanism of the seat of FIG. 1.

An embodiment of the invention provides a seat 10 for a pushchair, as shown in the figures. The seat 10 comprises a seat body 12, a bumper bar 14, and first and second drive mechanisms 16.

A bumper bar (also often referred to as a bump bar) is a safety bar provided on a pushchair seat, which extends forwardly and around the seating area and is intended to help prevent a child falling out of the seat and/or to offer some protection to the child from collision with external objects.

The seat body 12 comprises a seat back 18 and a seat base 20. The seat back 18 is mounted for pivotable movement relative to the seat base 20. As shown in FIGS. 6-8 and 12-14, the seat back 18 is moveable between a stowed position generally adjacent to the seat base 20 (FIGS. 6 and 14) and an operating position spaced from and extending at an angled of approximately 100° to the seat base 20 (FIGS. 8 and 12), in which the seat body 12 is configured to receive a child. The seat 10 is also provided with a foot rest 22, as will be described in more detail below.

Figure 12:
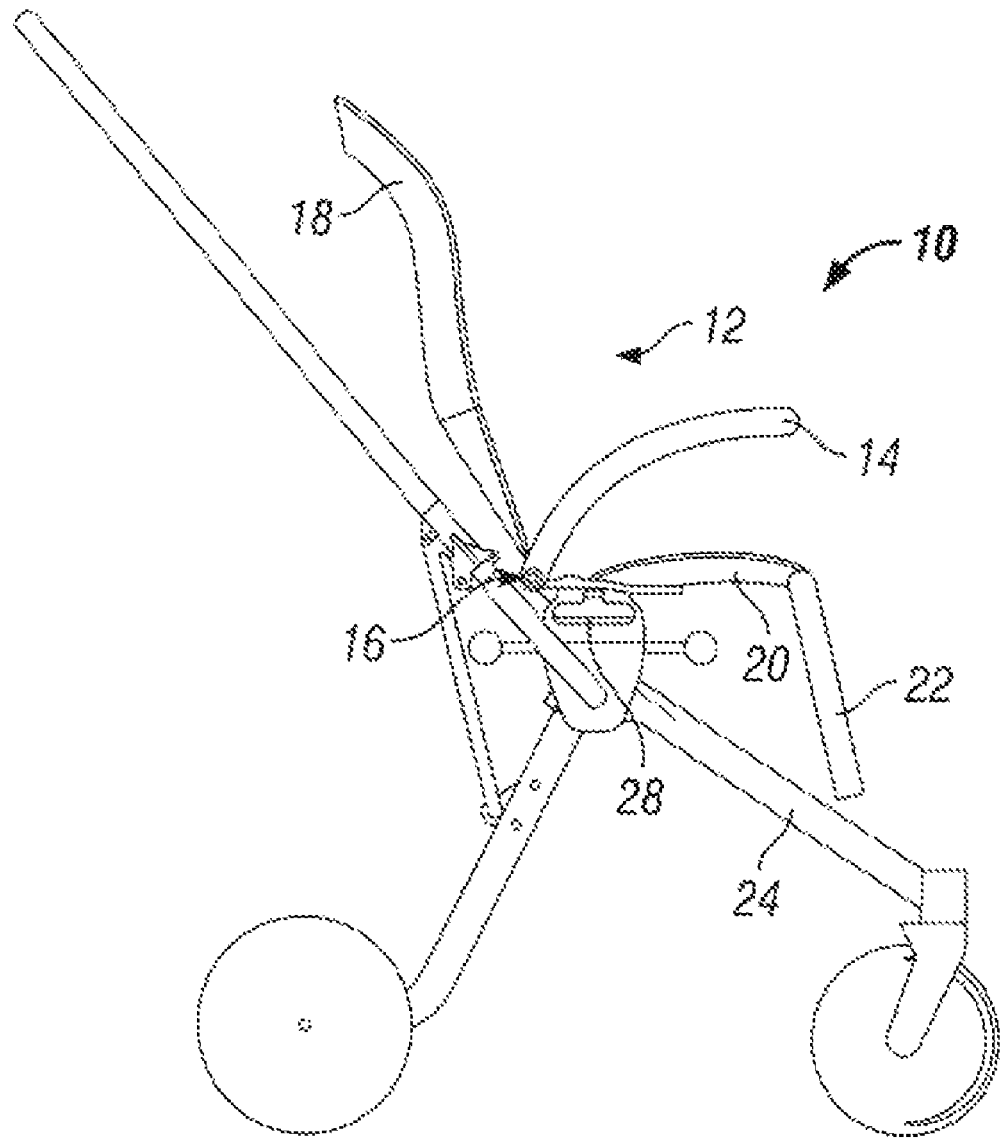
FIG. 12 is a diagrammatic side view (from the other side) of the seat of FIG. 1 shown mounted on a pushchair, the seat back being in the operating position and the bumper bar in the deployed position.
Figure 13:
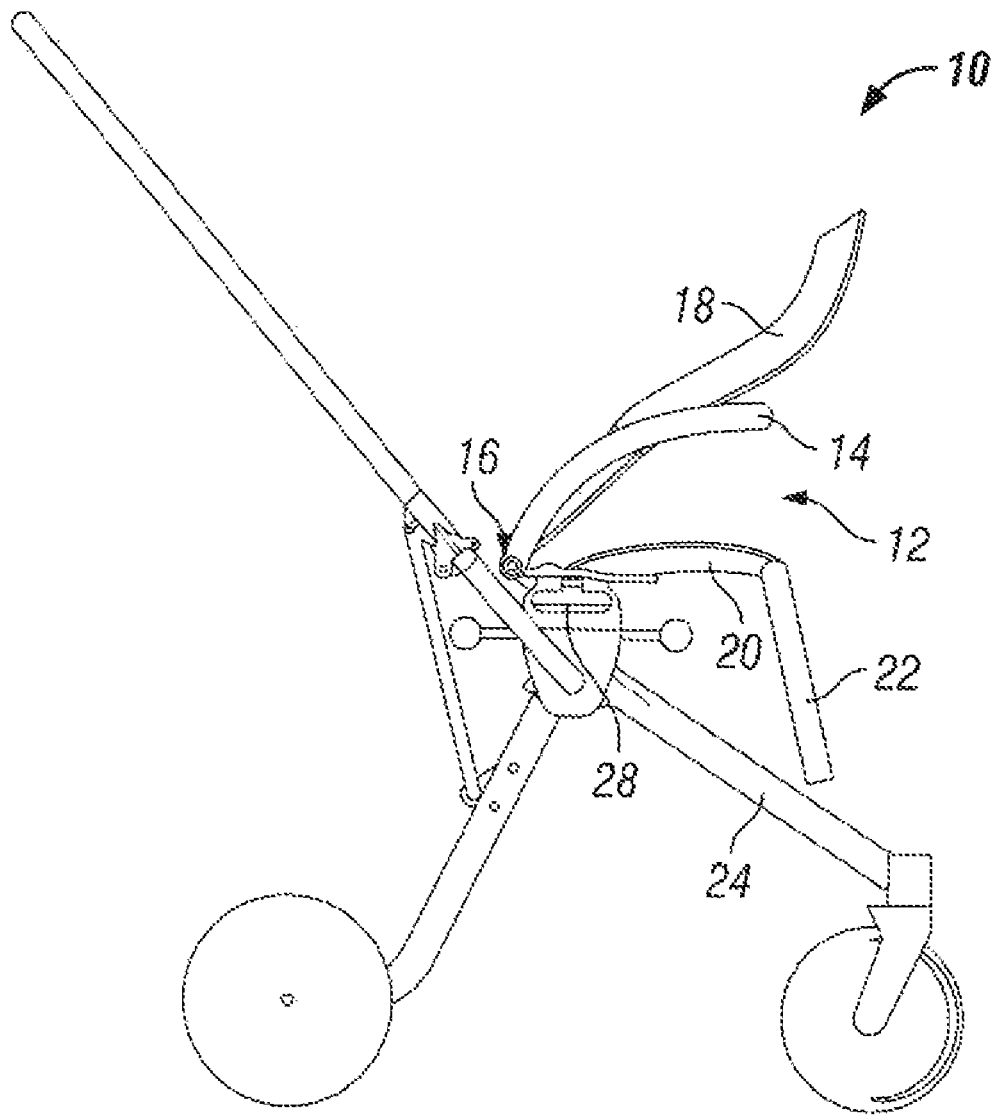
FIG. 13 is a diagrammatic side view of the seat of FIG. 1 shown mounted on a pushchair, the seat back being in an engagement position and the bumper bar being in the deployed position.
Figure 14:
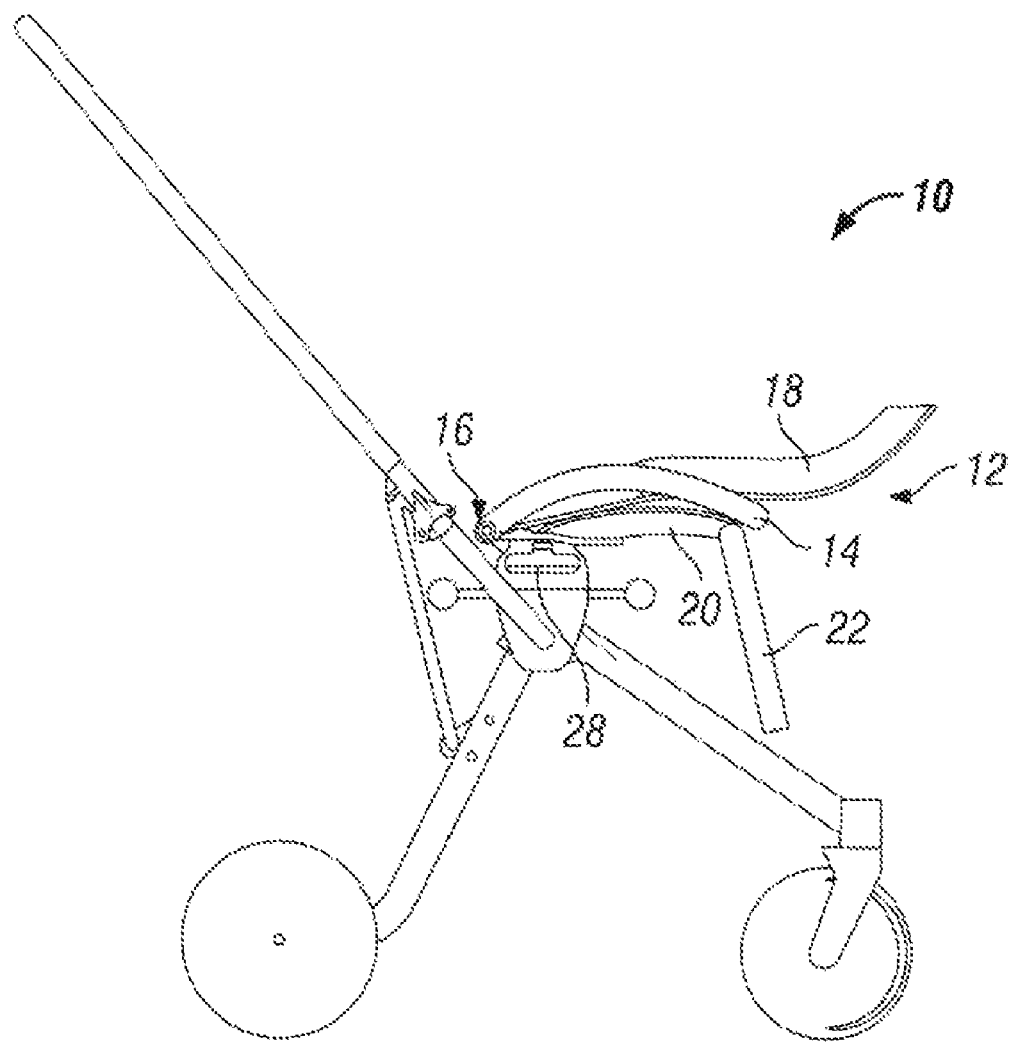
FIG. 14 is a diagrammatic side view of the seat of FIG. 1 shown mounted on a pushchair, the seat back and the bumper bar being in their stowed positions.

The seat 10 of this example is adapted for releasable attachment to a pushchair frame 24 (as shown in FIGS. 12-14), and is provided with a mechanical attachment mechanism 26 on the underside of the seat base 20. The attachment mechanism is releasable by means of operating paddles 28.

Figure 6:
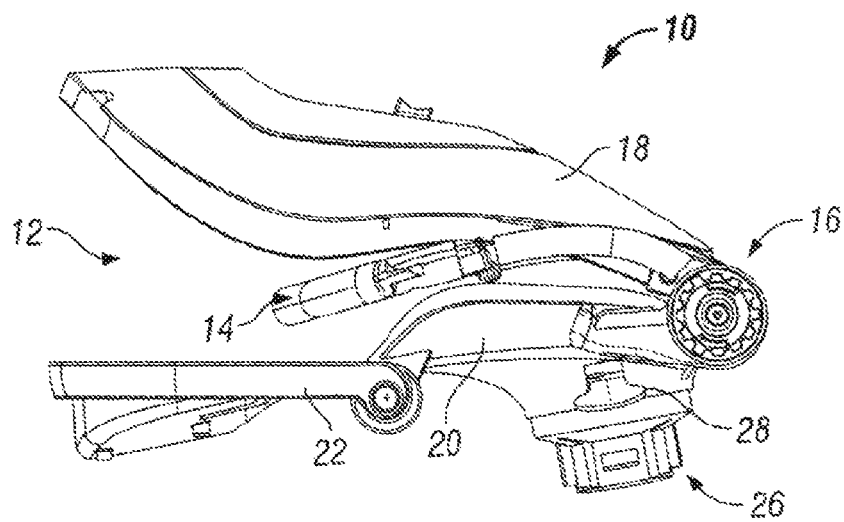
FIG. 6 is a diagrammatic side view of the seat of FIG. 1 with the seat back and bumper bar in the respective stowed positions.

The bumper bar 14 is pivotably coupled to and carried by the seat body 12, as will be described in more detail below. The bumper bar 14 of this example comprises a generally U shaped member with an attachment housing 14a at either end, by which the bumper bar 14 is coupled to the drive mechanisms 16. The bumper bar 14 is moveable between a stowed position generally adjacent to the seat base 20 (as shown in FIGS. 6 and 14) and a deployed position spaced from the seat back 18 and the seat base 20 (as shown in FIGS. 1, 8 and 11-13). In the deployed position, the bumper bar 14 is located intermediate the seat back 18 and the seat base 20, at an angle of approximately 45° to the seat base.

Each drive mechanism 16 comprises a selectively engageable coupling mechanism, which in this example takes the form of a clutch mechanism 30, 32, and a control mechanism 34, 56, 58. The clutch mechanism comprises a driving member 30 and a driven member 32. The driving member 30 is coupled to the seat back 18 by means of a shaft 36, such that movement of the seat back 18 between its stowed position and its operating position causes rotation of the shaft 36 which is transmitted into a corresponding rotation of the driving member 30.

Figure 5:
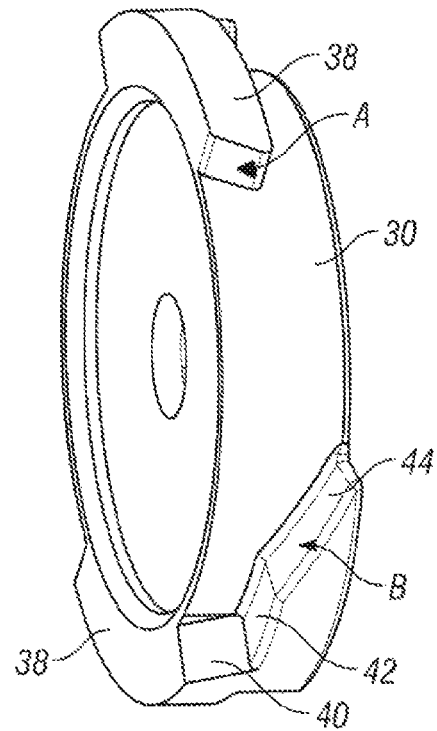
FIG. 5 is a diagrammatic representation of the driving member of the drive mechanism of FIG. 2.

The driving member 30 (shown in FIG. 5) is provided with two cam members 38 on its external surface. Each cam member 38 defines a first cam surface A at one side of the cam member 38 and a second cam surface B oppositely located on the cam member 38. The first cam surface A comprises an angled end of the cam member 38. The second cam surface B comprises an oppositely angled engagement surface 40, an intermediate surface 42 and a ramped leading edge 44.

Figure 4:
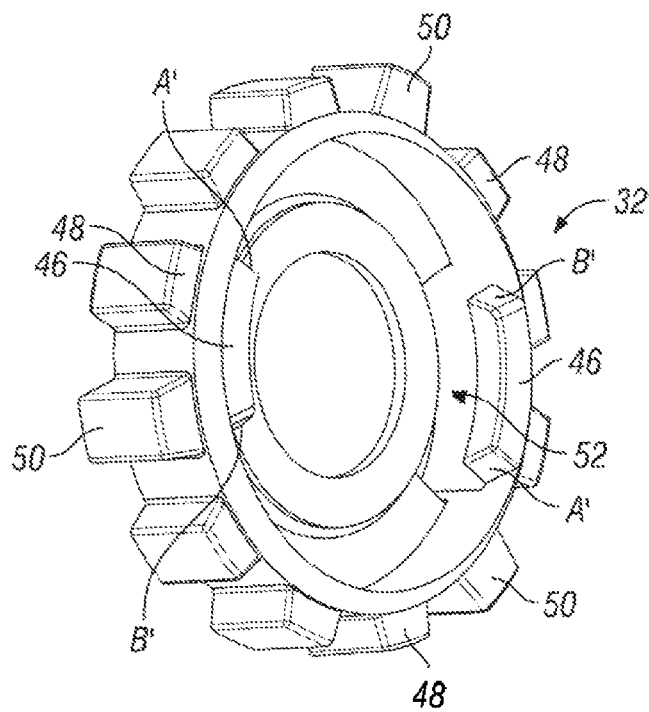
FIG. 4 is a diagrammatic representation of the driven member of the drive mechanism of FIG. 2.

The driven member 32 (shown in FIG. 4) is provided, on its internal surface, with first and second cam followers 46. Each cam follower 46 is provided with a first driving surface A' and a second driving surface B' oppositely provided on the cam follower. Each of the driving surfaces A', B' comprise angled end faces of the cam followers 46. On its external surface, the driven member 32 is provided with a spaced series of axially extending locating splines 48 and three key members, in the form of axial extending key splines 50, having a different size and sectional profile to the locating splines 48. The internal surface of the driven member 32 additionally defines a recess 52, in board of the cam followers 46, which is adapted to receive the cam members 38 on the driving member 30, and part of the driving member 30, when the cam member 30 is moved out of alignment with the cam followers 46 during engagement of the drive mechanism 16, as will be described in more detail below.

The driven member 32 is carried by the bumper bar 14 and is rotationally fixed relative to the bumper bar 14. A housing socket 54 is provided within the attachment housing 14a. The housing socket 54 is of a complimentary shape to the external surface of the driven member 32, such that the driven member 32 is free to move axially within the housing but has a fixed rotational position within the attachment housing 14a.

The control mechanism comprises an actuator in the form of a resilient spring 34, and a lock body 56 defining a locking socket 58. The locking socket 58 is of a complementary shape to the driven member 32 and is adapted to receive a leading part of the driven member 32, when the key splines 50 on the driven member 32 are aligned with the correspondingly shaped parts of the locking socket 58, as will be described in more detail below. The lock body 56 is fixed to the seat base 20.

Figure 3:
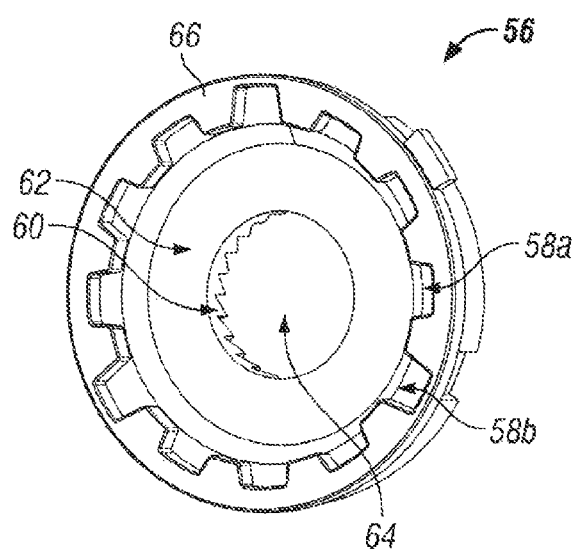
FIG. 3 is a diagrammatic representation of the locking socket of the drive mechanism of FIG. 2.

The lock body 56 (shown in FIG. 3) is provided, on one side, with a series of locking sockets 58a, 58b and a central recess 60. A series of ratchet teeth 62 are provided on the opposite side of the lock body 56. The locking sockets 58a are adapted to partly receive the locating splines 48 on the driven member 32 and the three locking sockets 58b are adapted to partly receive the three key splines 50 on the driven member 32. The recess 62 is adapted to receive the driving member 30. A central aperture 64 is also provided in the lock body 56, through which the shaft 36 coupling the driving member 30 to the seat back 18 is located. The lock body 56 is further provided with a guide surface 66 on its other side across which the facing surfaces of the locating splines 48 and key splines 50 travel as the driven member 32 rotates.

The resilient spring 34 is provided between the internal surface 54a of the housing socket 54 and a spring seat 32a provided on the driven member 32, and acts to bias the driven member 32 towards the lock body 56. The locating splines 48 and key splines 50 are thereby urged into abutment with the guide surface 66 when the key splines 50 are not aligned with the locking sockets 58b and are urged into the to locking sockets 58a, 58b when the key splines 50 are aligned with the locking sockets 58b, as will be described in more detail below.

Figure 11:
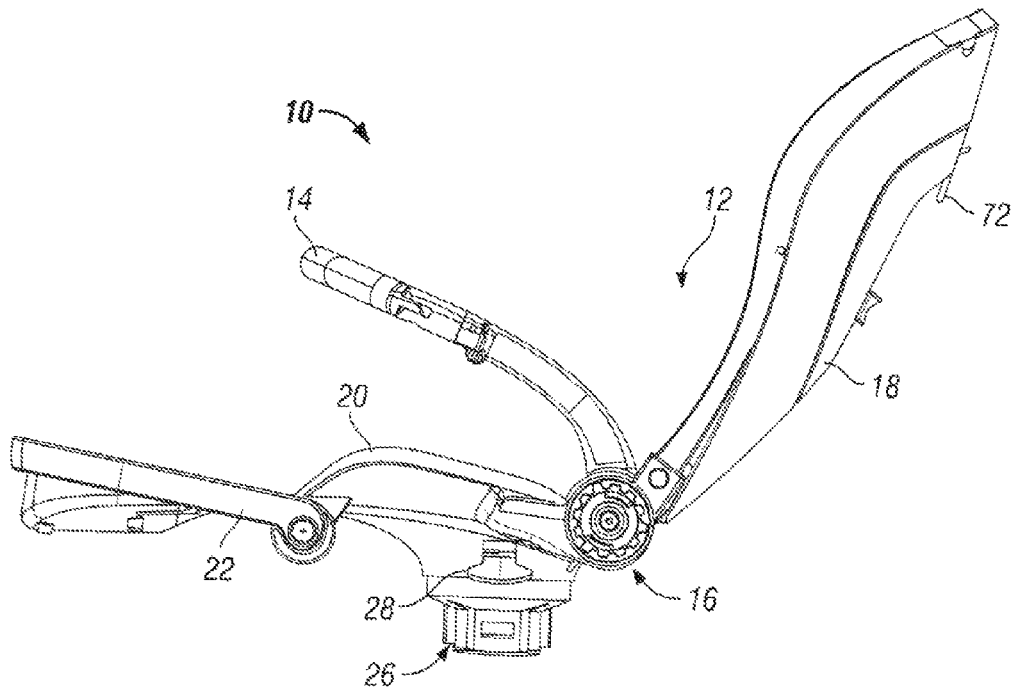
FIG. 11 is a diagrammatic side view of the seat of FIG. 1 with the seat back in a reclined position and bumper bar in the deployed position.

The seat 10 is additionally provided with a ratchet member 68 which is coupled to the seat back 18. The ratchet member 68 is provided on one side with a series of ratchet teeth 70, adapted for releasable engagement with the ratchet teeth 60 provided on the lock body 56. The ratchet mechanism formed between the lock body 56 and the ratchet member 68 is operable to control movement of the seat back 18 between its operating position and a reclined position (as shown in FIG. 11) of up to 150° with respect to the seat base 20. A release mechanism, including a release handle 72 (FIG. 11) is provided by which the sets of ratchet teeth 60, 70 may be disengaged to allow free movement of the seat back 18 between its operating position and a reclined position. The release mechanism is additionally operable to release the sets of ratchet teeth 60, 70 to enable folding of the seat back 18 towards the seat base 20.

Figure 15:
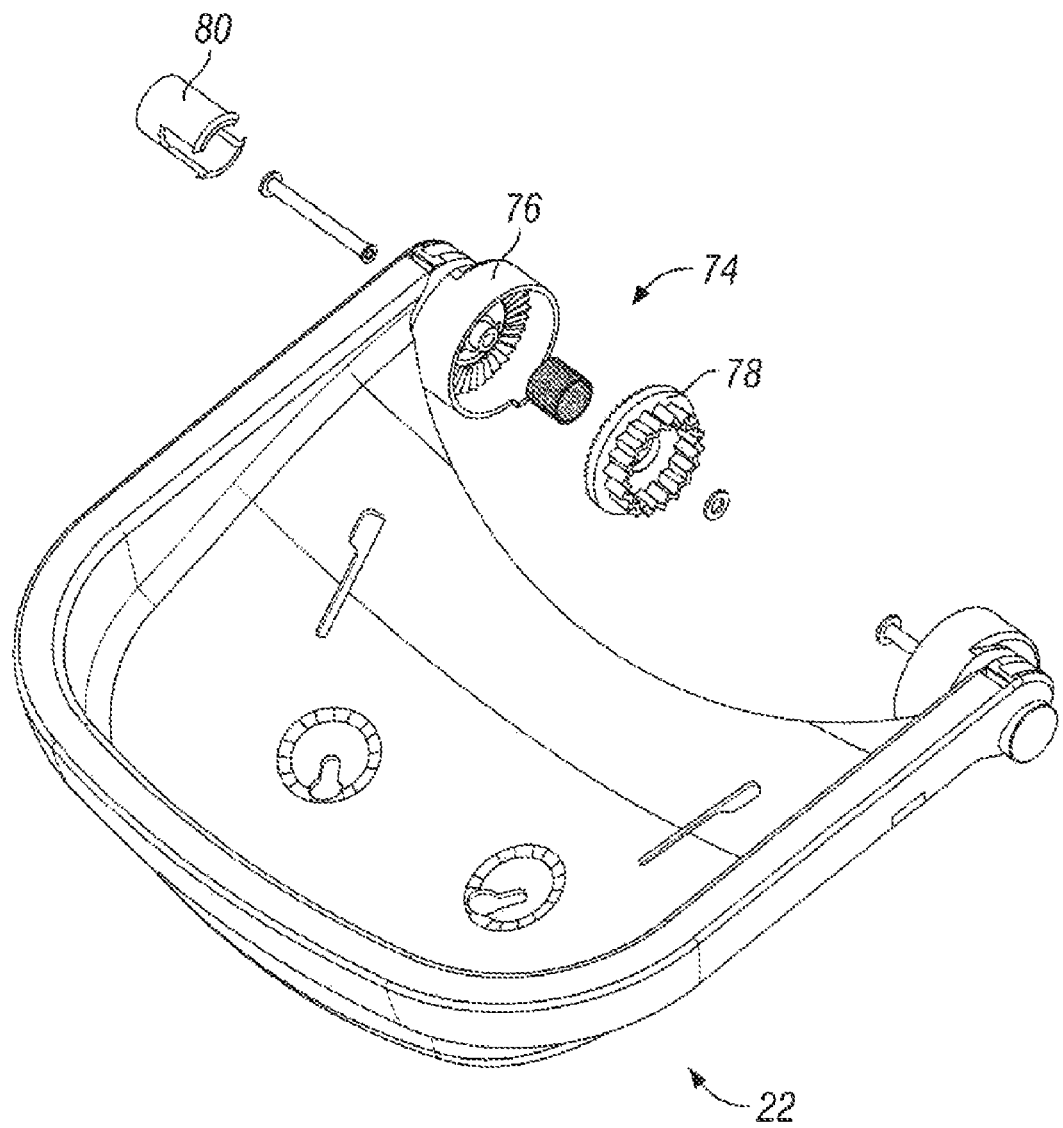
FIG. 15 is a diagrammatic part exploded diagrammatic representation of the foot rest of the seat of FIG. 1.

The seat 10 is also provided with a foot rest 22 (FIG. 15) which is coupled to the seat base by means of a second ratchet mechanism 74 comprising a first ratchet plate 76 coupled to the foot rest and a second ratchet plate 78 coupled to the seat base 20. A release button 80 is provided by which the ratchet plates 76, 78 may be disengaged, to allow free movement of the foot rest 22.

In this example, a drive mechanism 16 is provided at each end of the bumper bar 14, within the respective attachment housings 14a. Similarly, a ratchet mechanism 74 is provided at either side of the foot rest 22. It will however be appreciated that the seat 10 may alternatively be implemented with only a single drive mechanism 16 provided at only one end of the bumper bar 14 and/or with a single ratchet mechanism 74 provided between the foot rest 72 and seat base 20. The other end of the bumper bar 14 and the other side of the foot rest 22 would, in such an arrangement, be pivotably coupled to the seat 10. Movement of the bumper bar 14 would therefore be controlled by a single drive mechanism 16.

Figure 7:
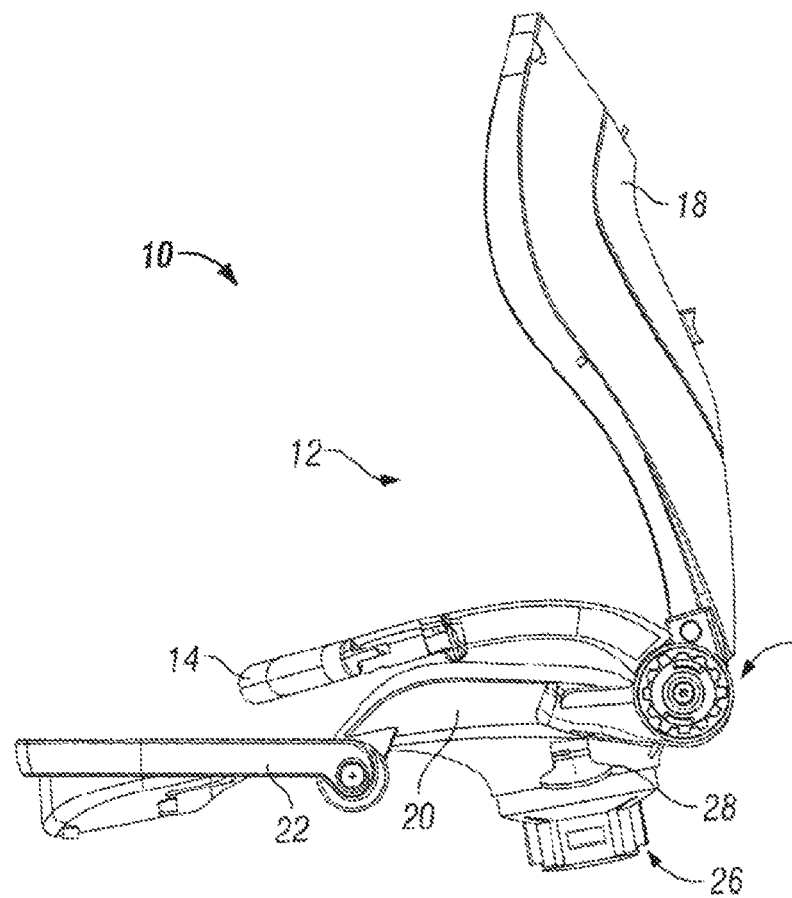
FIG. 7 is a diagrammatic side view of the seat of FIG. 1 with the seat back in an intermediate position and bumper bar in its stowed position.

Unfolding of the seat 10 will now be described. Starting with the seat back 18 and bumper bar 14 in their stowed positions (FIG. 6) a user manually lifts and raises the seat back 18 (upwardly and to the right as orientated in the drawings) to raise the seat back 18 from its stowed position into an intermediate position (FIG. 7). In the stowed position, the end faces of the locating splines 48 and the key splines 50 on one side of the driven member 32 (the right hand side as orientated in the drawings) are engaged with and rest on the guide surface 66 of the lock body 56.

As the seat back 18 is raised, the driving member 30 is correspondingly rotated (in the clockwise direction as shown in the drawings) moving the first cam surfaces A into engagement with the first driving surfaces A' on the driven member 32. During this initial movement of the seat back 18 only the driving member 30 rotates, with the driven member 32 remaining stationery and thus the bumper bar 14 remaining in the stowed position.

Figure 8:
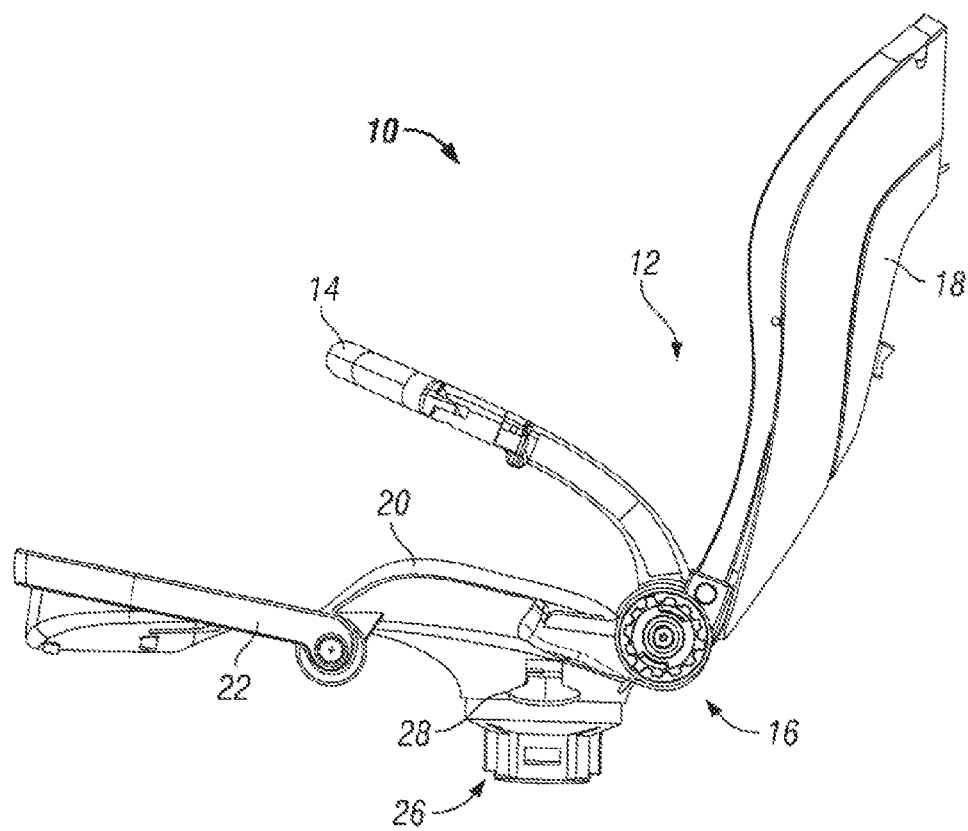
FIG. 8 is a diagrammatic side view of the seat of FIG. 1 with the seat back in the operating position and bumper bar in the deployed positions.

Continuing movement of the seat back 18 from the intermediate position (FIG. 7) to its operating position (FIG. 8) causes continued rotation of the driving member 30, during which the cam members 38 drive against the cam followers 46, causing corresponding rotation of the driven member 32. Since the driven member 32 and the bumper bar 14 are fixed together for rotational movement, the bumper bar is thereby raised from its stowed position to its deployed position (FIG. 8).

Figure 9:
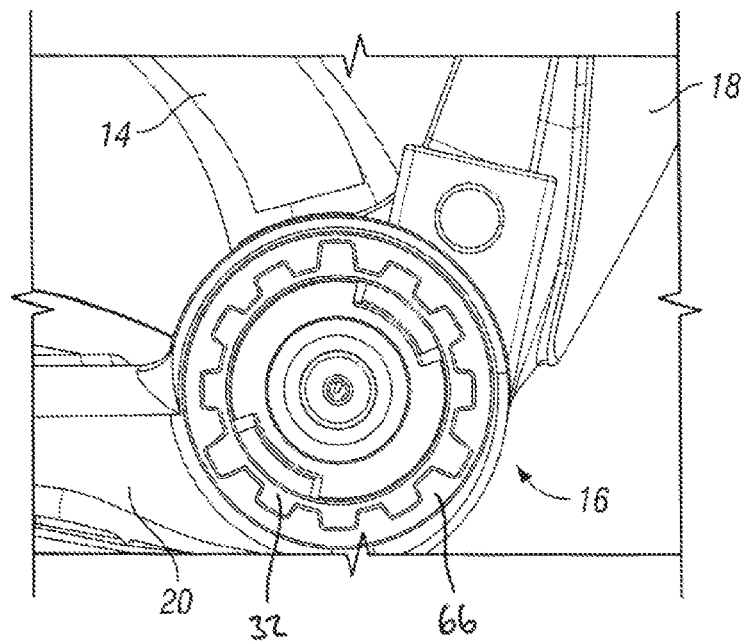
FIG. 9 is an enlarged side view of the drive mechanism of the seat of FIG. 8 (shown with its external cover removed)

As the driven member 32 rotates, the ends of the locating splines 48 and the key splines 50 abutting the guide surface 66 travel across the guide surface 66. Due to the fact that the key splines 50 are longer than the locating splines 48, the locating splines 48 and the key splines 50 do not engage with the locking sockets 58a, 58b during this phase of movement since the key splines 50 are out of alignment with the locking sockets 58b. When the seat back 18 reaches the operating position, and the bumper bar 14 reaches the deployed position, the key splines 50 come into alignment with the locking sockets 58b, as shown in FIG. 9. The actuation spring 34 then acts to axially move the driven member 32 towards the lock body 56, to bring the locating splines 48 and the key splines 50 into locking engagement with the locking sockets 58a, 58b. The position of the driven member 32 is now locked to the lock body 56, i.e. to the seat base 20, and the bumper bar 14 is thereby locked in its deployed position.

Figure 10:
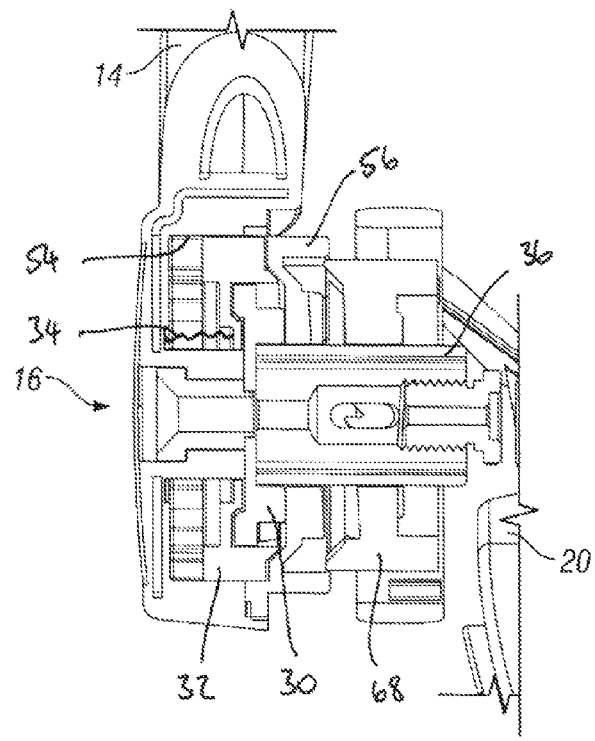
FIG. 10 is a diagrammatic part-cut away representation along line A-A of the drive mechanism of the seat of FIG. 1, with the seat as configured in FIG. 8.

As a result of the axial movement of the driven member 32, the relative positions of the driving member 30 and the driven member 32 are changed, and the driving member 30 is consequently received within the recess 52 within the driven member 32. The cam members 34 are thereby moved out of the plane of the cam followers 46, as shown in FIG. 10.

Further movement of the seat back 18 from its operating position into a reclined position (FIG. 11) causes further rotation of the driving member 30, which rotates within the recess 52 in the driven member 32. However, as the cam members 34 are no longer in the same plane as the cam followers 46, no rotation of the driven member 32 is produced. The seat back 18 can therefore be reclined without causing any further movement of the bumper bar 14.

Folding of the seat from its operating position (FIG. 12) to its stowed position (14) will now be described. The release handle 72 is actuated causing operation of the release mechanism, thereby releasing the ratchet teeth 60, 70. The seat back 18 is then free to be moved from its operating position into an unlocking position slightly spaced from the bumper bar 14. As the seat back 18 is moved, the driving member 30 undergoes counter-rotation (being rotation in the opposite sense to the rotation experienced by the driving member 30 during unfolding of the seat back). During this counter-rotation the driving member 30 rotates within the recess 62 in the driven member 32, until the second cam surface B is brought into engagement with the second driving surface B' on the driven member 32. Initial engagement between the second cam surface B and the second driving surface B' is made by the ramped leading edge 44 of the second cam surface B. As the seat back 18 is continued to be moved towards the seat base 20, from the unlocking position into a clutch engagement position generally co-located with the bumper bar (which is still in its deployed position), the driving member 30 continues to rotate and the engagement between the ramp leading edge 44 of the second cam surface B and the second driving surface B' causes the driven member 32 to be axially moved away from the lock body 56. The locating splines 48 and key splines 50 are thereby axially moved out of engagement with the locking sockets 58a, 58b. At this point the bumper bar 14 is unlocked and free to rotate towards its stowed position.

A further small amount of counter rotation of the driving member 30 occurs, as the intermediate surface of the second cam surface B passes across driving surface B', following which the engagement surface 40 of the second cam surface B engages with the driving surface B'. Continued movement of the seat back 18 towards its stowed position causes continuing counter-rotation of the driving member 30, which produces corresponding counter-rotation of the driven member 32, thereby moving the bumper bar 14 towards the seat base 20, and into its stowed position, as shown in FIG. 14.

In use, the foot rest 22 may be unlocked for downwards motion by operating the release button 80, following which the foot rest 22 will drop from a raised position (as shown in FIG. 1) into a lowered position (as shown in FIG. 12), under the action of gravity. A user may then lift the foot rest 22 back into a desired operating position, by manually raising the foot rest 22 against the action of the ratchet mechanism 74. Once in the desired position, the ratchet mechanism 74 retains the foot rest 22 in that position.

Various modifications may be made to the described embodiment without departing from the scope of the present invention. In particular, the clutch mechanism may have a different form to that described. For example, the cam members and cam followers may be provided in different positions relative to one another, such that there is no period during which the initial movement of the seat back does not rotate the driving member but instead the cam members are already in contact with the cam followers. This would result in the bumper bar being moved towards its deployed position as soon as movement of the seat back commences. The cam members and cam follower may also be of a different shape and configuration to those described, and a different number of cam members and cam followers may be provided.

While the described embodiment provides for movement of the bumper bar from the stowed position to the deployed position and from the deployed position to the stowed position under control of the movement of the seat back, it will be appreciated that the drive mechanism may alternatively be adapted to provide for movement of the bumper bar from the stowed position to the deployed position or from the deployed position to the stowed position under control of the movement of the seat back.

The seat back may have a more restricted range of movement than that described and may be restricted to move between stowed position and its operation position, with further reclining movement of the seat back not being allowed. Both the seat and the bumper bar may be of a different shape and configuration to those shown, with the bumper bar alternatively comprising two separate sections, each provided with a drive mechanism. Similarly, the foot rest may be of a different shape to that shown and may be attached to the seat base in a different location or arrangement. The locating splines and the key splines may have a different shape and arrangement to those shown, and a different number of each may be provided. The locking sockets and the lock body would be correspondingly modified.

The invention claimed is:

1. A seat for a pushchair, the seat comprising:
   a seat body comprising a seat back and a seat base, the seat back being mounted for pivotable movement relative to the seat base and being movable between a stowed position generally adjacent to the seat base and an operating position spaced from and extending generally upwardly from the seat base;
   a bumper bar pivotably coupled to and carried by the seat body, the bumper bar being movable between a stowed position generally adjacent to the seat base and a deployed position spaced from the seat back and the seat base; and
   a drive mechanism comprising a selectively engageable coupling mechanism provided between the seat back and the bumper bar and operable to couple movement of the seat back between its stowed position and its operating position into corresponding movement of the bumper bar between its stowed position and its deployed position, and a control mechanism operable to disengage the selectively engageable coupling mechanism once the bumper bar has reached its deployed position, such that the relative positions of the bumper bar and the seat base become fixed;

wherein the selectively engageable coupling mechanism comprises a clutch mechanism comprising a driving member coupled to the seat back and a driven member coupled to the bumper bar, the driving member being arranged such that as the seat back is moved the driving member engages with the driven member and causes the driven member to rotate, thereby causing corresponding movement of the bumper bar, and the driving member is provided with a cam member and the driven member is provided with a cam follower.

2. A seat as claimed in claim 1, wherein:
the control mechanism is further operable to engage the selectively engageable coupling mechanism as the seat back is moved from the operating position towards its stowed position.

3. A seat as claimed in claim 1, wherein:
the driven member is carried by the bumper bar and is rotationally fixed relative to the bumper bar and mounted for axial movement relative to the bumper bar.

4. A seat as claimed in claim 1, wherein:
the driving member is arranged such that as the seat back is unfolded from its stowed position to an intermediate position the driving member is brought into engagement with the driven member, and as the seat back is subsequently moved from the intermediate position towards the operating position the driving member causes the driven member to rotate, thereby moving the bumper bar from its stowed position towards its deployed position.

5. A seat as claimed in claim 1, wherein:
the cam member and the cam follower are arranged such that a first rotational movement of the driving member causes the cam member to engage with the first cam follower and subsequent rotational movement of the driving member causes the driven member to correspondingly rotate.

6. A seat as claimed in claim 1, wherein:
the cam member and the cam follower are arranged such that movement of the cam member starts from a position of engagement with the cam follower and rotational movement of the drive member causes the driven member to correspondingly rotate.

7. A seat as claimed in claim 1, wherein:
the driving member is arranged such that as the seat back is moved from its operating position to an engagement position in the region of the deployed position of the bumper bar the driving member is brought into engagement with the driven member, and as the seat back is subsequently moved towards its stowed position the driving member causes counter-rotation of the driven member, thereby moving the bumper bar towards its stowed position.

8. A seat as claimed in claim 1, wherein:
the control mechanism comprises an actuator operable to move the driving member axially relative to the driven member, such that the cam member is moved out of alignment with the cam follower.

9. A seat as claimed in claim 8, wherein:
the driven member comprises a recess adapted to at least partially receive the driving member when it is out of alignment and in which the driven member is free to rotate.

10. A seat as claimed in claim 8, wherein:
the control mechanism further comprises a locking socket provided on the seat base and a key member provided on the driven member, the locking socket being adapted to at least partially receive the driven member and the key member, and the actuator is adapted to bias the driven member towards the locking socket such that when the bumper bar reaches its deployed position, the key member becomes aligned with the locking socket and the actuator causes axial movement of the driven member and the key member into the locking socket.

11. A seat as claimed in claim 8, wherein:
the cam member and the cam follower are arranged such that a first counter-rotational movement of the driving member causes the cam member to engage with the cam follower and subsequent counter-rotational movement of the driving member releases the driven member from the locking socket and causes the driven member to correspondingly rotate, causing the bumper bar to move towards its stowed position.

12. A seat as claimed in claim 11, wherein:
the cam member has a ramped leading edge, such that the subsequent counter-rotation of the driving member causes axial movement of the driven member out of the locking socket.

13. A seat as claimed in claim 1, wherein:
the seat further comprises a mechanical ratchet mechanism coupled between the seat back and the seat base and operable to control movement of the seat back between its operating position and a reclined position.

14. A seat as claimed in claim 1, further comprising:
attachments means for attaching the seat to a pushchair frame including a push/pull handle, a front wheel frame on which at least one front wheel is rotatably mounted, and a rear wheel frame on which at least one rear wheel is rotatably mounted.

15. A pushchair comprising:
pushchair frame including a push/pull handle, a front wheel frame on which at least one front wheel is rotatably mounted, and a rear wheel frame on which at least one rear wheel is rotatably mounted; and
a seat as claimed in claim 1, wherein the seat further comprises attachments means for attaching the seat to the pushchair frame.

* * * * *